G. H. Becker.
Accumulating Power.
No 72156      Patented Dec. 17, 1867.
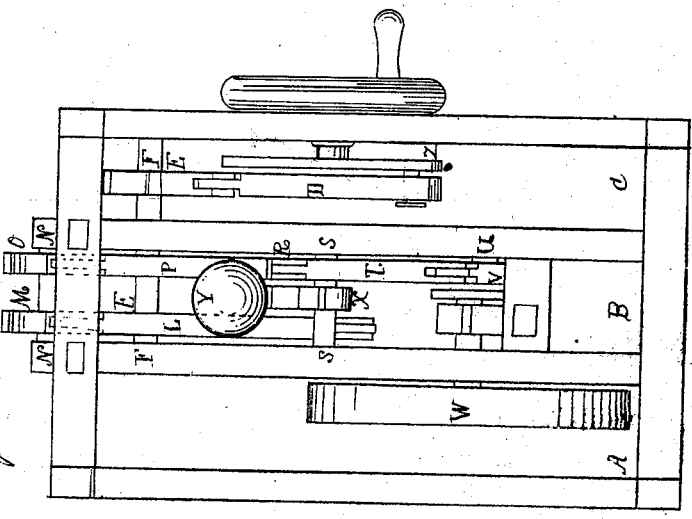
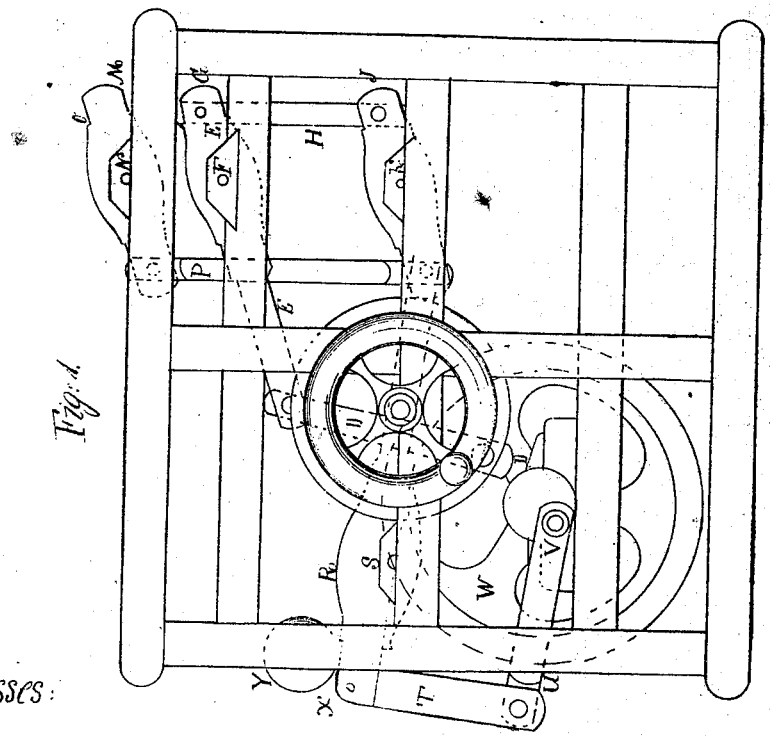
Witnesses:
Inventor:
G. H. Becker

United States Patent Office.

GEORGE H. BECKER, OF MEMPHIS, TENNESSEE, ASSIGNOR TO HIMSELF AND JOHN C. LANIER, OF SAME PLACE.

Letters Patent No. 72,156, dated December 17, 1867.

IMPROVEMENT IN DEVICE FOR ACCUMULATING POWER.

The Schedule referred to in these Letters Patent and making part of the same.

TO ALL WHOM IT MAY CONCERN:

Be it known that I, GEORGE H. BECKER, of the city of Memphis, Shelby county, and State of Tennessee, have invented a certain new and useful Combination of Levers and Weights Accumulating Power for the Enforcement of Machinery, &c., which is designated and is to be known as "Becker's Lever-Combination for Accumulating Power;" and I do hereby declare that the following is a full and exact description thereof, reference being had to the accompanying drawings, and to the letters of reference marked thereon, making a part of this specification.

The nature of this invention, as will be seen by reference to the drawings hereto attached, consists in the arrangement and combination of certain levers and weights, supported on shafts and fulcra, and so connected, by means of connecting-rods or pitmen, as to form a continuous leverage throughout the entire structure or frame in which the combination is arranged.

By means of this continuous leverage, which extends throughout the structure, great power is accumulated or gained wherever the same is attached to or connected with any of the known motive-powers for enforcing machinery. The accumulation or gain of power commences at the point at which the combination is connected with the power to be used, (applicable to water or steam or any other motive-power now in use,) and continuing to accumulate or increase, by means of the leverage combination throughout the structure, until it reaches its highest degree or greatest power at the point where the same is attached to the machinery to be operated.

To enable others skilled in the art to make and use the invention, I will proceed to describe its construction and operation, and in order to do so more fully and accurately, will give the exact sizes and dimensions of the entire construction, from which the drawings accompanying these specifications were taken, including the frame or structure in which the combination is arranged or fixed, and the various lengths, sizes, and arrangements of the several levers, pitmen, or connecting-rods, weights, &c., thereto attached.

In the first place I construct, out of hard, solid, durable, and substantial wood, a frame structure of sufficient strength and steadiness to support the movements and operations of the various levers and pitmen intended to be used therein. (The size of such structure can be regulated altogether by the amount of power or force which the levers are required to move or perform, and may be made or manufactured of either hard wood or iron.) The size of the frame or structure above alluded to, and from which the drawings hereto attached are taken, is of the following dimensions, to wit:

Figure No. 1, on the drawings, represents a side elevation of the structure in which the combination is arranged or combined. The height of this structure from bottom to top is intended to be about seven feet; the length thereof from right to left about seven feet.

Figure No. 2 represents an end elevation of the structure, and is in height from bottom to top about seven feet, and in width from right to left about four feet four inches. This structure, as will be seen from the end view, fig. 2, is divided by substantial crossings, well supported by uprights and horizontals, into three partitions, which are represented by the letters A, B, and C, within two of which partitions, B and C, the several levers are suspended or located, resting on shafts and fulcra, supported by the several crossings above mentioned, and connected with each other by means of connecting-rods or pitmen, and are severally worked as hereinafter explained. All of the levers, shafts, and pitmen, or connecting-rods, should be made or manufactured of such steel or iron as is used for other machinery of a similar character.

Fig. No. 1 represents a side elevation of the structure and combination to which the motive-power is to be attached. This attachment is formed in the usual way of connecting motive-power, by means of a perpendicular connecting-rod or pitman, designated in Fig. No. 1 by the letter D. This pitman D is three feet six inches in length, and by means of a bolt at the upper end thereof, is connected with a horizontal single lever, designated in Fig. No. 1 by the letter E. This lever E works or rests in the structure upon a shaft and fulcrum, designated in Fig. No. 1 by the letter F. The length of the lever E from the pitman D to the fulcrum F is two feet eight inches; where said lever E terminates and is securely fastened, by bolts and screws or otherwise, to the shaft and fulcrum F, upon which fulcrum F lever E operates in continuation of the leverage combination. Shaft or fulcrum F is three by three inches square, and is two feet eleven inches long, extending across partitions B and C, and is supported by journals at each end, resting in iron or steel boxes let into the structure at letter in F Figs. Nos. 1 and 2.

Upon the termination of lever E, by its connection with the shaft and fulcrum F, the leverage connection is kept up by the introduction of another single lever in partition B, securely fastened, by bolts and screws or otherwise, to the fulcrum F, which last-mentioned lever is operated upon or moved by the action of the lever E upon shaft and fulcrum F. This lever is designated in Fig. No. 1 by the letter G, and appears in the drawings the same and corresponds with lever E. It is attached, however, to the shaft and fulcrum F at the opposite end from the lever E in partition B, and performs its part of the combination in partition B. The length of this lever G, from the centre of fulcrum F to its connection with the pitman H, is thirteen inches. It is there connected, by means of a bolt, with the pitman H, hanging perpendicularly in partition B. This pitman H, as designated in Fig. No. 1, is two feet long, and at the lower end thereof is attached, by a bolt, to a double lever, which is designated in Fig. No. 1 as lever J. This lever J works or rests upon a shaft and fulcrum extending across partition B, which fulcrum is supported by journals at each end, and resting in iron or steel boxes let into the structure at letter K in Fig. No. 1. This fulcrum or shaft is designated in Fig. No. 1 as fulcrum K, and is three by three inches square, and is one foot eight inches long. The entire length of the lever J is two feet two inches, being thirteen inches from the pitman H to the fulcrum K, and thirteen inches from the fulcrum K to the opposite end of said lever, where the said lever is connected with an upright perpendicular pitman, designated in Fig. No. 1 as pitman L. The length of pitman L, from its connection with lever J upwards to its connection with a single lever in partition B, elevated just above the lever J, and designated in Fig. No. 2 as lever M, is three feet. The upper end of the pitman L is connected with lever M by means of a bolt. This lever M works or rests in the structure upon a shaft and fulcrum, designated in Fig. No. 2 by the letter N. The length of the lever M from the pitman L to the fulcrum N is thirteen inches, where said lever M terminates and is securely fastened, by bolts and screws or otherwise, to the fulcrum N, upon which fulcrum N lever M operates in continuation of the leverage connection. The shaft or fulcrum N is three by three inches square, and is one foot eight inches long, extending across the partition B, and is supported by journals at each end, resting in iron or steel boxes let into the structure at letter N in Fig. No. 2.

Upon the termination of lever M, by its connection with the fulcrum N, the leverage connection is kept up or continued by the introduction of another single lever in partition B, securely fastened, by bolts and screws or otherwise, to the fulcrum N, which last-mentioned lever is operated upon or moved by the action of the lever M upon the fulcrum N. This lever is designated in Figs. Nos. 1 and 2 by the letter O, and is attached to the fulcrum N at the opposite end from the lever M, and performs its part of the combination in partition B. The length of this lever O, from the centre of the fulcrum N to its connection with pitman P, is thirteen inches. It is there connected, by means of a bolt, with the pitman P, hanging perpendicularly in partition B. This pitman P, as designated in Figs. Nos. 1 and 2, is three feet long, and at the lower end thereof is attached, by a bolt, to a double lever, which is designated in Figs. Nos. 1 and 2 as lever R. This lever R works or rests upon a shaft and fulcrum extending across partition B, which fulcrum is also supported by journals at each end, and resting upon iron or steel boxes let into the structure at letter S in Figs. Nos. 1 and 2. This shaft or fulcrum is designated in Figs. Nos. 1 and 2 as fulcrum S, and is three by three inches square, and is one foot and eight inches long. The entire length of the lever R is four feet six inches, the distance or length from pitman P to the fulcrum S being three feet and two inches thereof, and the distance or length from the fulcrum S to the termination or end of lever R being one foot and four inches. At this latter termination or end of lever R is fixed an eccentric perpendicular connecting-arm, inserted firmly into and at right angles with lever R, and is designated in Figs. Nos. 1 and 2 as connecting-arm T. The length of this connecting-arm T, from its connection with lever R downwards to the other end thereof, is one foot and six inches, at which point or end it is again connected with a pitman, horizontally suspended at right angles therewith, which is designated in Figs. Nos. 1 and 2 as pitman U. This pitman U is two feet two inches in length from its point of connection with connecting-arm T to its other termination or end, where it is connected with a crank, designated in Figs. Nos. 1 and 2 by the letter V, at which point, by means of a crank and a driving or a band-wheel thereto attached, designated in Figs. Nos. 1 and 2 by the letter W in partition A, the whole of said combination is immediately connected with the machinery which is to be operated.

In addition to the several levers heretofore explained, connected with the combination, there is yet another horizontal lever, which is designated in Figs. Nos. 1 and 2 as lever X. This lever X works or rests upon the shaft and fulcrum S, and is securely fastened thereto by bolts and screws or otherwise. This lever X is firmly fixed to the fulcrum and shaft S, as above stated, in the partition B, and is parallel with the short end of lever R. This lever X is used for the purpose of suspending thereto any quantity of weight which may be deemed necessary to facilitate the operation of the combination and the working of the machinery. This weight is represented by a ball, designated in Figs. Nos. 1 and 2 by the letter Y, and rests on or is suspended at the end of lever X, and is so regulated that it can be removed on the lever X, either nearer to or further from the fulcrum S; or the lever X may be either shortened or lengthened from the fulcrum S, as may be desired, for the purpose of regulating the weight. The manner in which this weight tends to facilitate the operation of the combination, and the working of the machinery, is illustrated thus: First, (after equally balancing and adjusting the weight with the several levers of the combination in a horizontal position,) by suspending or attaching the weight Y, of, say, ninety pounds, to the outer end of the lever X, at a distance of eighteen inches from the fulcrum S, by the natural descent or gravitation thereof, a power equal to the weight of ninety pounds is produced. This weight of ninety pounds is again raised to its full height, and worked or operated at each successive stroke of the combination, by the means of a motive-power or weight of six pounds, that may be attached to the lower end of pitman D or the point at which the motive-power is to be attached or connected therewith;

and thus in proportion, any quantity of weights, as may be desired, may be attached to or suspended from the lever X, and raised or worked again to its full height by a proportinal motive-power or weight attached to or connected with the lower end of the pitman D, of six pounds to every ninety pounds attached to or suspended from the lever X.

In addition to the above specification, the inventor may, if deemed necessary, substitute a perpendicular pitman, of any desired length, in the place of the connecting-arm T, and to which pitman the crank V and the driving or band-wheel W may be attached in the same manner as to the horizontal pitman U; as also the connecting-arm T and a horizontal pitman of any desired length may be substituted and used in the place of the pitman D whenever a change may be desired.

The construction of the frame that supports the said leverage combination, as arranged or combined for operation, can be so altered or changed, enlarged or reduced, and so shaped as to be adaped to a connection with any and all of the motive-powers now in use, and to any and all machinery now in use, which is propelled by motive-power of any description whatever; and furthermore, that by attaching duplications of the levers and weights thereto, of a similar combination and principle as above explained, and by otherwise lengthening the levers to any or the desired extent, additional power and strength may yet be augmented or accumulated by this combination to a still greater extent.

The working of this combination is commenced by the motion of a small wheel or crank attached to the lower end of pitman D, designated or represented in Fig. No. 2 by the letter Z.

This now completes a full description of the entire combination, from the point at which the motive-power is applied to the same at letter Z, in Fig. No. 2, and running through its entire length to the point at which said combination is attached to the machinery to be operated at the driving-wheel W in Figs. Nos. 1 and 2 and partition A of the drawings, herewith appended.

What I claim as my invention, and desire to secure by Letters Patent, is—

The construction and combination of the levers E, G, J, M, O, R, and X with the pitmen D, H, L, P, and U, the connecting-arm T, and the wheel W and weight Y, when arranged as herein described, and for the purpose set forth.

G. H. BECKER.

Witnesses:
J. FRANKLIN REIGART.
A. C. KLINK.